(12) United States Patent
Banaczuk (10) Patent No.: US 9,640,050 B2
(45) Date of Patent: May 2, 2017

(54) WIRING HARNESS

(71) Applicant: Bose Corporation, Framingham, MA (US)

(72) Inventor: Michael Banaczuk, Blackstone, MA (US)

(73) Assignee: Bose Corporation, Framingham, MA (US)

( * ) Notice: Subject to any disclaimer, the term of this patent is extended or adjusted under 35 U.S.C. 154(b) by 158 days.

(21) Appl. No.: 14/549,828

(22) Filed: Nov. 21, 2014

(65) Prior Publication Data

US 2016/0149383 A1    May 26, 2016

(51) Int. Cl.
| | |
|---|---|
| G08B 13/12 | (2006.01) |
| G08B 13/14 | (2006.01) |
| H01R 13/639 | (2006.01) |
| G06F 21/88 | (2013.01) |
| H01R 27/02 | (2006.01) |

(52) U.S. Cl.
CPC ............ *G08B 13/12* (2013.01); *G06F 21/88* (2013.01); *H01R 13/6395* (2013.01); *H01R 27/02* (2013.01)

(58) Field of Classification Search
CPC .... G08B 13/12; H02G 3/0406; H02G 3/0456; H02G 3/06
USPC ...................................................... 340/568.4
See application file for complete search history.

(56) References Cited

U.S. PATENT DOCUMENTS

| | | | | |
|---|---|---|---|---|
| 3,396,460 | A * | 8/1968 | Wetmore | H01R 4/22 174/84 R |
| 4,003,228 | A * | 1/1977 | Lievens | E05B 73/0005 70/18 |
| 4,576,207 | A * | 3/1986 | Levine | B29C 61/0608 138/177 |
| 4,915,139 | A * | 4/1990 | Landry | B29C 61/0616 138/103 |
| 5,279,135 | A * | 1/1994 | Leyden | E05B 69/006 70/18 |
| 6,386,906 | B1 * | 5/2002 | Burke | G08B 13/1445 439/501 |
| 7,007,912 | B1 | 3/2006 | Giuliani et al. | |

(Continued)

OTHER PUBLICATIONS

SKAC25 Accu Cables, ADJ Products LLC, [retrieved Jun. 20, 2016], Retrieved from Internet: <URL: http://www.adj.com/products/american-audio/accu-cables>.*

(Continued)

*Primary Examiner* — Nader Bolourchi
(74) *Attorney, Agent, or Firm* — Brian M. Dingman; Dingman IP Law, PC (57) ABSTRACT

A wiring harness with a number of electrical wires, each constructed and arranged to carry electrical signals, and each having a length. There is also a security cable that is not constructed and arranged to carry electrical signals. The security cable has a length that is less than the length of any of the electrical wires, and has a greater tensile strength than that of any of the electrical wires. The electrical wires and the security cable are bonded together over only a portion of their respective lengths into a reinforced multi-wire cable assembly, while over another portion of their respective lengths the electrical wires and the security cable are separate from one another.

15 Claims, 7 Drawing Sheets

(56) References Cited

U.S. PATENT DOCUMENTS

| | | | |
|---|---|---|---|
| 7,384,304 B1* | 6/2008 | Fawcett | H01R 13/6395 |
| | | | 439/567 |
| 2011/0072862 A1* | 3/2011 | Avganim | E05B 67/006 |
| | | | 70/58 |
| 2012/0268103 A1 | 10/2012 | Henson et al. | |
| 2014/0355233 A1 | 12/2014 | Mobed | |

OTHER PUBLICATIONS

Medium Wall Cross-linked Polyolefin, DSG-CANUSA, [retrieved Jun. 21, 2016], Retrieved from Internet: <URL: http://www.heatshrink.com/heat_shrink_tubing/cfm_d_4ft.asp>.*
USB, Wikipedia, [retrieved Jun. 20, 2016], Retrived from Internet: <URL: http://en.wikipedia.org/wiki/USB>.*
RCA connector, Wikipedia, [retrieved Jun. 20, 2016], Retrived from Internet: <URL: http://en.wikipedia.org/wiki/RCA connector>.*
Heat-shrink tubing, Wikipedia, [retrieved Jun. 20, 2016], Retrived from Internet: <URL: http://en.wikipedia.org/wiki/Heat-shrink tubing>.*
U.S. Appl. No. 14/339,585, filed Aug. 24, 2014, Joji Ueda.

* cited by examiner

WIRING HARNESS

BACKGROUND

This disclosure relates to a wiring harness.

Portable electronic consumer products, including but not limited to wireless loudspeakers, are often displayed by retailers. Sales are supported if the products are fully operable. In some but not all cases it is also desirable to remotely control the products while they are displayed. Thus power, audio signals and control signals need to be provided to the products.

It is also useful to be able to secure the products, to deter theft. This is often accomplished by adhering an anchor to the product and then running a strong tether from the anchor to a nearby fixed location. However the anchor may mar or destroy the surface, which makes it difficult or impossible to sell the displayed product. Also, the anchor may interfere with the product's functionality. Such anchors are thus an additional expense and an inconvenience.

SUMMARY

This disclosure features a wiring harness which has a number of separate wires that are used to provide data, audio and power connections to a portable electronic consumer product at retail display. The wiring harness includes a security cable that does not carry electrical signals and that is shorter than the wires. The wires and the security cable are bonded together over only a portion of their lengths. This allows the security cable to be securely fixed to a retail display or other fixed object, while the wires are coupled to a source of audio signals, control signal, and power to operate the consumer product. The wiring harness thus allows the consumer product to function fully while at the same time securely tethering the product to inhibit theft, but without marring the surface of the product.

All examples and features mentioned below can be combined in any technically possible way.

In one aspect, a wiring harness includes a number of electrical wires, each constructed and arranged to carry electrical signals, and each having a length, and a security cable that is not constructed and arranged to carry electrical signals. The security cable has a length that is less than the length of any of the electrical wires, and has a greater tensile strength than that of any of the electrical wires. The electrical wires and the security cable are bonded together over only a portion of their respective lengths into a reinforced multi-wire cable assembly, while over another portion of their respective lengths the electrical wires and the security cable are separate from one another.

Embodiments may include one of the following features, or any combination thereof. The electrical wires may carry power, data and audio signals. The power and data may be carried over one wire. The data may comprise control signals. The wiring harness may be operably connected to a portable loudspeaker such that the power, control signals and audio signals are provided to and used to operate the loudspeaker.

Embodiments may include one of the above or below features, or any combination thereof. The wiring harness may further include a strain relief structure that is part of the reinforced multi-wire cable assembly. The strain relief structure may comprise a ring that is integral with the reinforced multi-wire cable assembly. The wiring harness may further comprise an overmolded plug body at one end of the reinforced multi-wire cable assembly. The security cable may have an enlarged end that is embedded in the plug body.

Embodiments may include one of the above or below features, or any combination thereof. The wiring harness may further comprise an assembly that is constructed and arranged to secure the plug body to a portable loudspeaker such that the plug body is operably coupled to the loudspeaker in a manner such that power, data and audio signals carried by the electrical wires are provided to and used to operate the loudspeaker. The portable loudspeaker may have opposed sides that each include a protrusion, and the assembly that is constructed and arranged to secure the plug body to a portable loudspeaker may comprise two separate plug body anchoring members each of which has a first portion that overlies a protrusion on a side of the loudspeaker and a second portion that is adjacent to the plug body. The assembly that is constructed and arranged to secure the plug body to a portable loudspeaker may further comprise a tie member that is coupled to and overlies the second portions of the plug body anchoring members, and that encircles the plug body. The tie member may comprise two separable tie member portions that are coupled together to create the tie member.

Embodiments may include one of the above or below features, or any combination thereof. The second portions of the anchoring members may each have a plug body retention feature that engages with the plug body to inhibit the plug body from being operably decoupled from the loudspeaker. The plug body may have one or more protrusions that are located proximate the loudspeaker when the plug body is operably coupled to the loudspeaker. The plug body retention features may in this case comprise a recess in each anchoring member into which a protrusion is fitted. The plug body may comprise a first portion that is adjacent to the loudspeaker, and the electrical wires may be terminated by plugs that protrude from the first portion of the plug body and are received in the loudspeaker. The plug body further may comprise a second portion that is integral with and lies at an angle to the first portion, and that is overmolded on the reinforced multi-wire cable assembly.

In another aspect, a merchandise display for a portable electronic consumer product that has opposed sides that each include one or more protrusions, where the portable electronic consumer product also has a plurality of electrical connectors (e.g., jacks) that are adapted to accept power, data and audio signals which are used to operate the consumer product, includes a display structure that is constructed and arranged to support the consumer product, and a wiring harness for physically securing, and providing power, data and audio signals to, the consumer product. The wiring harness comprises a plurality of electrical wires that together carry power, data and audio signals, each having a length, a security cable that is not constructed and arranged to carry electrical signals in the wiring harness, wherein the security cable has a length that is less than the length of any of the electrical wires, and has a greater tensile strength than that of any of the electrical wires. The electrical wires and the security cable are bonded together over only a portion of their respective lengths into a reinforced multi-wire cable assembly, and over another portion of their respective lengths the electrical wires and the security cable are separate from one another. There is an overmolded plug body at one end of the reinforced multi-wire cable assembly. There is an assembly that is constructed and arranged to secure the plug body to the consumer product such that the plug body is operably coupled to the consumer product in a manner such that the power, data and audio signals are provided to and used to operate the consumer product. The assembly that is constructed and arranged to secure the plug body to a consumer product comprises two separate plug body anchoring members, each of which has a first portion that overlies a protrusion on a side of the consumer product and a second portion that is adjacent to the plug body, and a tie member that is coupled to and overlies the second portions of the plug body anchoring members, and that encircles the plug body. The second portions of the anchoring members each have a plug body retention feature that engages with the plug body to inhibit the plug body from being operably decoupled from the consumer product. The wiring harness is physically coupled to the display structure via the security cable. The wiring harness thus inhibits the consumer product from being removed from the display structure.

The plug body may have one or more protrusions proximate the consumer product when the plug body is operably coupled to the consumer product, and the plug body retention features may comprise recesses into which a protrusion is fitted. The plug body may comprise a first portion that is adjacent to the consumer product, wherein the electrical wires are terminated by connectors that protrude from the first portion of the plug body and are received in the consumer product. The plug body may further comprise a second portion that is integral with and lies at an angle to the first portion, and that is overmolded on the reinforced multi-wire cable assembly. The security cable may have an enlarged end that is embedded in the plug body. The power and data may be carried over one wire of the wiring harness. The data may comprise control signals. The wiring harness may be operably connected to the consumer product such that the power, control signals and audio signals are provided to and used to operate the consumer product.

DETAILED DESCRIPTION

A wiring harness that has a number of separate wires that are used to provide data, audio and power connections to a portable electronic consumer product at retail display. The wiring harness includes a strong security cable embedded in the wiring harness. The security cable is shorter than the wires. If the harness is tugged hard the security cable will absorb the force, thus preventing the wires from being compromised. The wiring harness also includes an assembly that secures an end of the harness to the consumer product. This assembly has features that overlie protrusions on opposed sides of the consumer product such that the assembly tightly couples to the product. The wiring harness thus allows the consumer product to function fully while at the same time securely tethering the product to inhibit theft, but without marring the surface of the product.

A wiring harness herein is used to physically secure and provide audio signals, control signals and/or power to a portable electronic consumer product. The wiring harness can be used to support the display and operation of a consumer product at retail, while at the same time inhibiting the ability to shoplift the product. Non-limiting examples of portable electronic consumer products that can use the wiring harness include wireless loudspeakers, laptop computers, smart phones, tablets, cameras, MP3 players, gaming consoles and other handheld electronic devices. The wiring harness is constructed and arranged to releasably couple to opposed sides of the consumer product. The coupling is such as to form a tight locational clearance fit with protrusions on the consumer product so that the wiring harness cannot be slipped off of or otherwise easily removed from the consumer product without physically distorting and damaging the product or the harness.

A non-limiting example of a wiring harness and a manner in which the wiring harness is coupled to and secures a consumer product is shown in FIGS. 1 through 8.

Figure 1A:
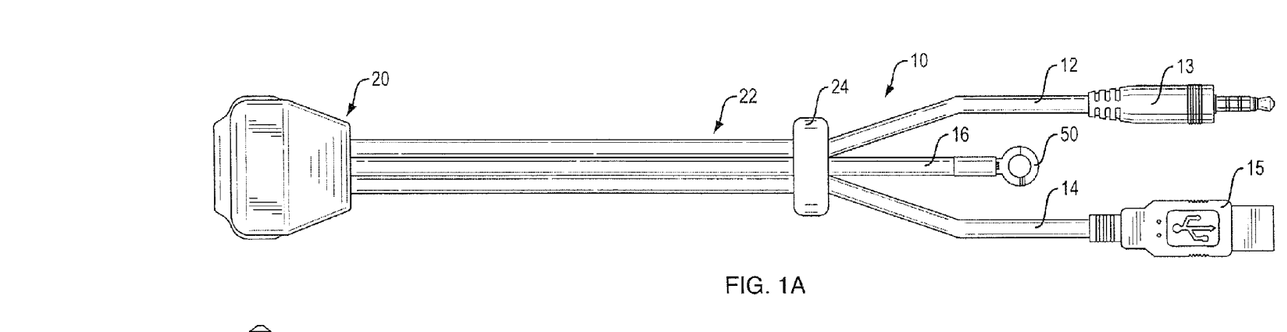
FIGS. 1A, 1B and 1C are side, top and end views, respectively, of a wiring harness.
Figure 1B:
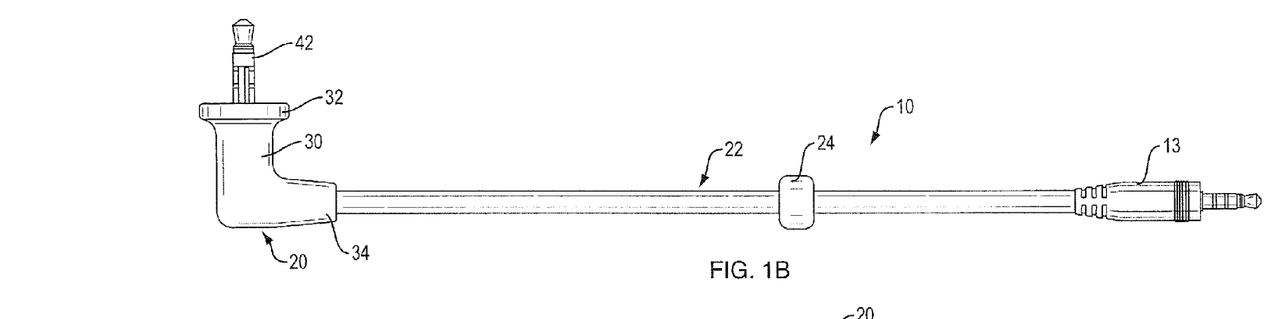
Figure 1C:
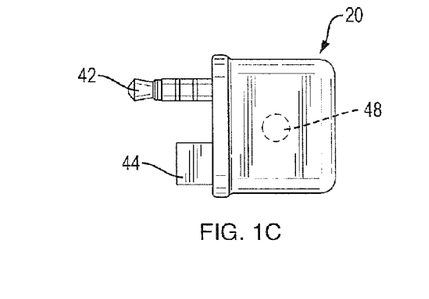

A non-limiting example of a wiring harness 10 of this disclosure is shown in the drawings. Wiring harness 10 includes one or more electrical wires; in this case wires 12 and 14. See FIG. 1. These electrical wires are constructed and arranged to carry electrical signals. Wire 12 is terminated at one end by stereo audio plug 13 and is terminated at the other end by stereo audio plug 42. Other electrical connectors that are able to carry audio signals could be used instead. Wire 14 is terminated at one end by USB connector 15 and terminated at the other end by mini USB connector 44. Other electrical connectors that are able to carry power and/or data signals could be used instead. Wiring harness 10 also includes security cable 16 which does not carry electrical signals. Security cable 16 is shorter than either of wires 12 and 14 and has greater tensile strength than that of wires 12 and 14. Security cable 16 thus provides strain relief. A result is that cable 16 strengthens the wiring harness.

The electrical wires and the security cable are bonded together into a reinforced multi-wire cable assembly 22, but over only a portion of their respective lengths. Over the rest of their lengths wires 12 and 14 and security cable 16 are not bonded together. The free length of wires 12 and 14 allows electrical connectors or plugs 13 and 15 to be coupled to desired sources of electrical signals. In one non-limiting example, wire 12 is adapted to carry audio signals that are supplied to a portable consumer product and wire 14 is adapted to carry electrical power and control signals that are supplied to the portable consumer product. In one non-limiting example, the portable consumer product is a portable wireless loudspeaker and the audio signals, power and control signals are provided to and used to operate the loudspeaker. Wiring harness 10 may include a strain relief structure that is part of the reinforced multi-wire cable assembly. In this non-limiting example, the strain relief structure comprises ring 24 that is integral with reinforced multi-wire cable assembly 22 and terminates one end of assembly 22. On the other side of strain relief structure 24, wires 12 and 14 and cable 16 are separate from one another, as shown in FIG. 1A.

Figure 2A:
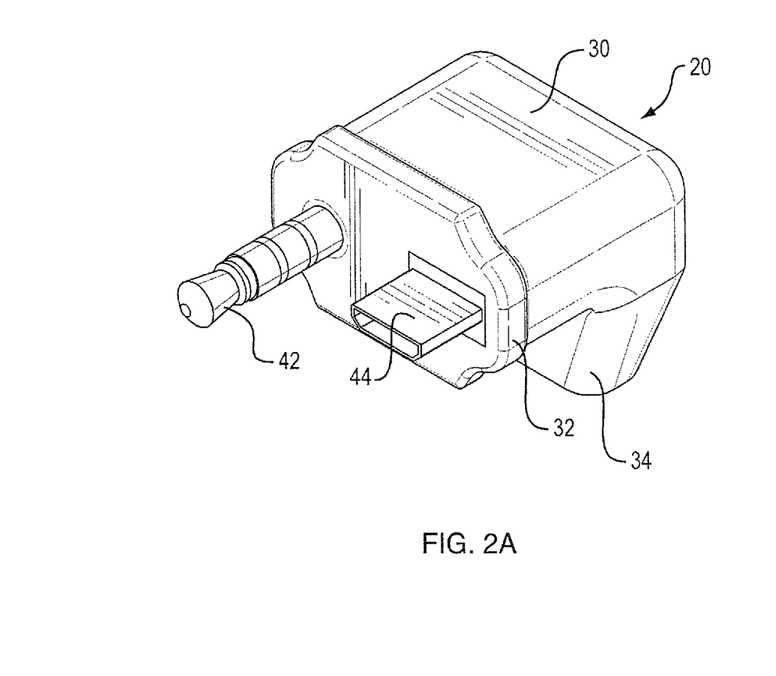
FIGS. 2A and 2B are front perspective and side views, respectively, of a plug body and connectors/plugs of a wiring harness.
Figure 2B:
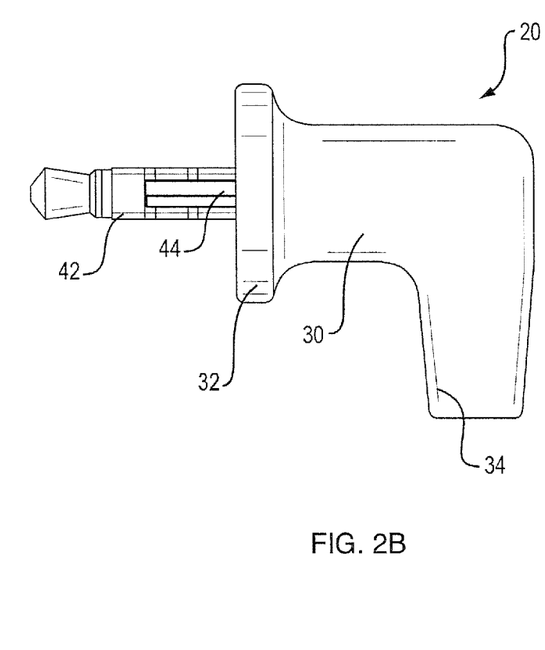
Figure 3A:
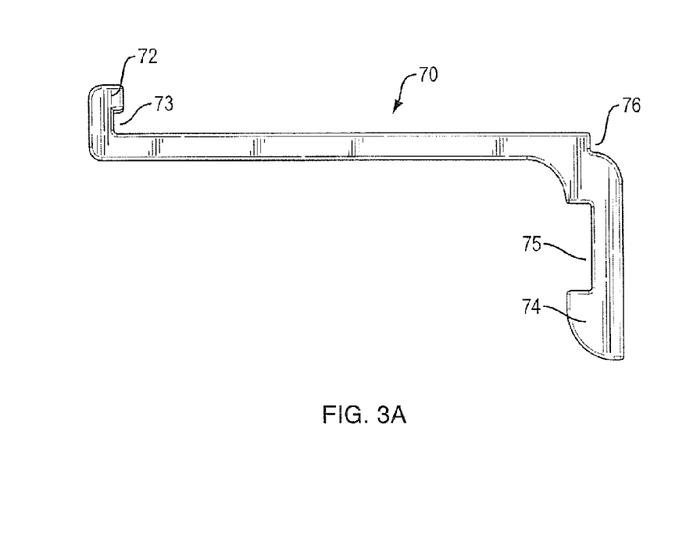
FIGS. 3A and 3B are top and perspective views of one example of a first plug body anchoring member for a wiring harness and FIGS. 4A and 4B are top and perspective views of one example of a second plug body anchoring member for a wiring harness.
Figure 3B:
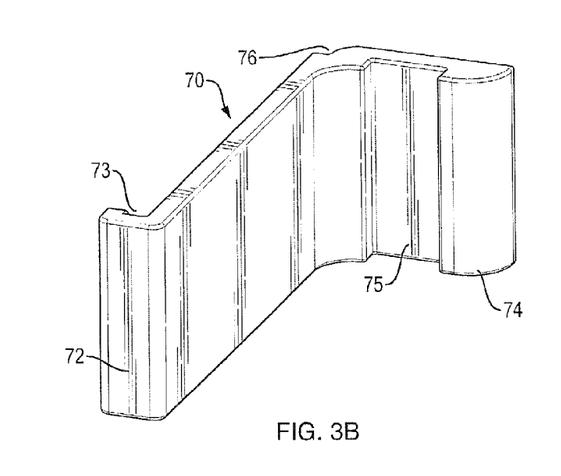
Figure 4A:
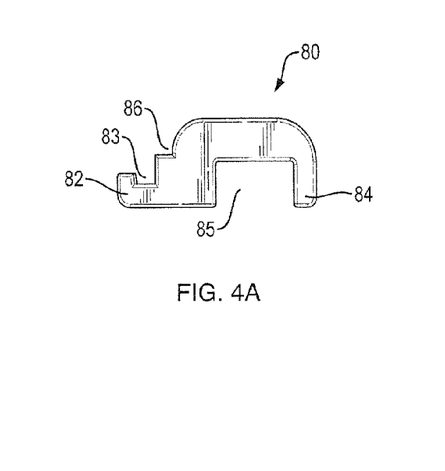
Figure 4B:
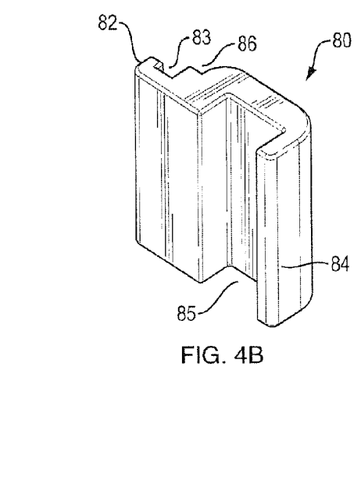
Figure 5:
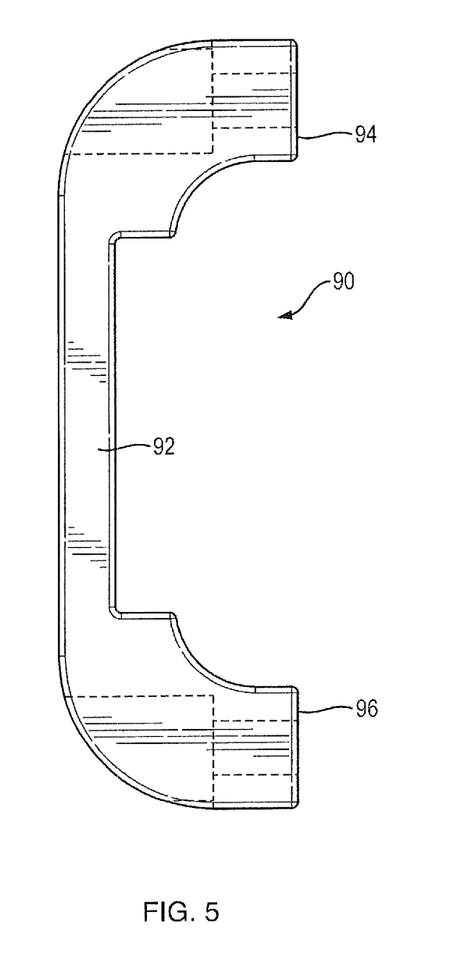
FIG. 5 is a side view of one tie member for a wiring harness.

In this example, one end of reinforced multi-wire cable assembly 22 is embedded within overmolded plug body 20, shown in FIGS. 1 and 2. Plug body 20, cable assembly 22 and strain relief 24 are preferably but not necessarily all created in a single overmolding process, using an appropriate material such as PVC. Security cable 16 preferably but not necessarily has enlarged ends. End 50 may be a ring as shown that allows cable 16 to be secured with a fastener to another structure, as described below. End 50 may take any other shape that facilitates its mechanical connection to a fixed structure. End 48 may also be a ring or may be a ball or other enlarged portion. End 48 is embedded within plug body 20. Security cable 16 is stronger than the electrical wires of the wiring harness; in one non-limiting example cable 16 is a stranded or woven steel cable. One result of this construction is that strain placed on wiring harness 10 will be taken up by security cable 16. If the wiring harness is tugged, the strain will be carried by cable 16 and plug body 20 rather than the wires 12 and 14 or their terminal connectors. Accordingly, strain applied to the wiring harness is unlikely to compromise or break wires 12 and 14, and so is less likely to affect the desired operation of the portable consumer product.

Plug body 20 preferably but not necessarily has a general "L" shape as best shown in FIG. 1B. Plug body 20 has first portion 30 that is generally aligned with the longitudinal axes of plug 42 and connector 44, and terminates with an enlarged annular lip 32. Plug body 20 has integral second portion 34 that lies generally at a right angle to the first portion 30 and is aligned with the longitudinal axis of cable assembly 22. Another advantage of the overmolded plug body and its shape is that strain applied at the free end of wiring harness 10 (at the right in FIG. 1A) will not couple to first portion 30 of plug body 20, and will not couple to connectors 42 and 44. Thus the terminations of wires 12 and 14 at connectors 42 and 44 will not be affected by such strain. Also, connectors 42 and 44 themselves will not be affected by any strain applied to the wiring harness.

The wiring harness preferably but not necessarily further includes an assembly 100 which is constructed and arranged to secure the plug body of the wiring harness to a portable consumer product such as a portable loudspeaker. See FIG. 8. Assembly 100 is adapted to secure the plug body to the portable consumer product while the connectors of the plug body are operably coupled to the consumer product in a manner such that the signals carried by wires 12 and 14 are provided to the consumer product. In the case where the consumer product is a portable wireless loudspeaker the wires may carry audio signals and power. The wires may also but need not necessarily carry control signals. A non-limiting example where control signals are used is in a retail display of a wireless portable loudspeaker, where control of the loudspeaker through the USB port is directly from a demo engine to the product. This results in takeover of functionality of the product buttons as well, and places the product in a demo state. The stereo cable portion in this case directly feeds an audio signal from the demo engine to the loudspeaker. A result is that the portable loudspeaker can be operated (and also if desired can be controlled) remotely by signals carried by wiring harness 10.

Figure 6:
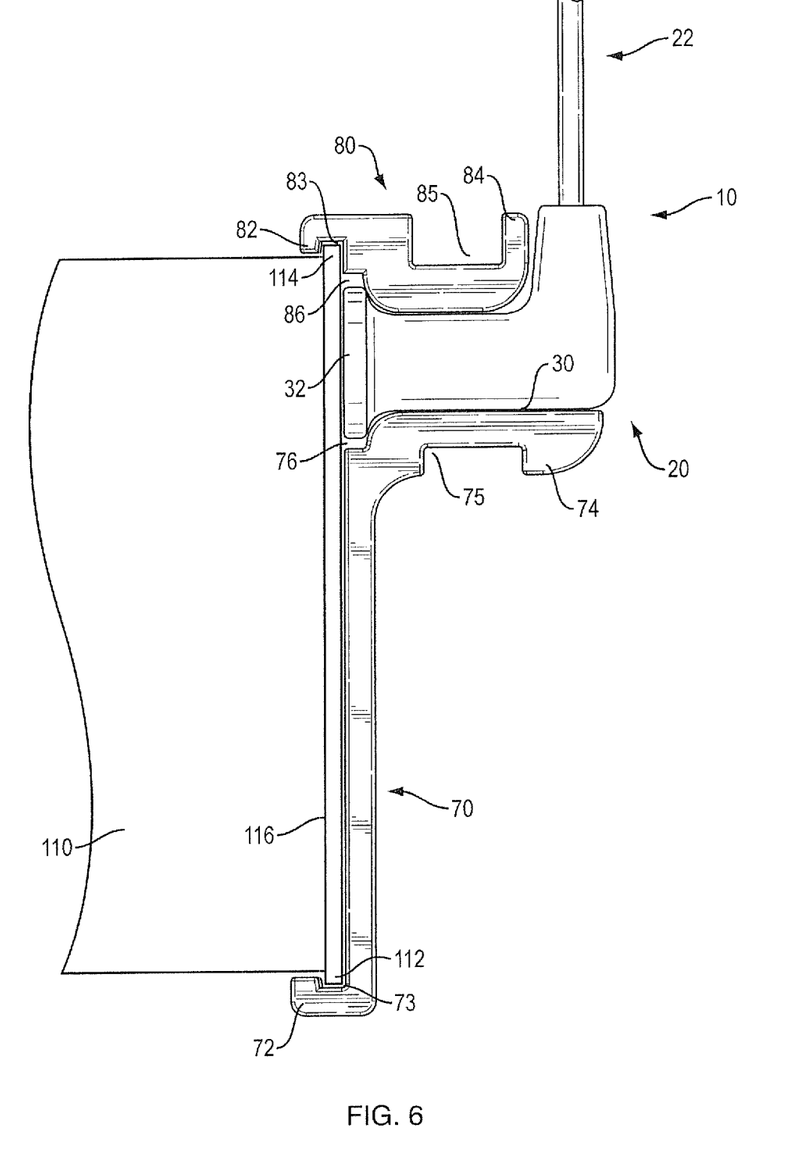
FIG. 6 is a partial top view of a wiring harness operably coupled to and secured to a consumer product.

Assembly 100 and its component parts are shown in FIGS. 3 through 8. Assembly 100 in this non-limiting example includes two separate plug body anchoring members 70 and 80, shown individually in FIGS. 3 and 4, respectively. Members 70 and 80 are strong enough to resist removal as described herein. Members 70 and 80 may be but need not be made of a metal such as aluminum or steel. The fitting and arrangement of this example of the plug body anchoring members with the loudspeaker and the plug body is best shown in FIG. 6. Each of the anchoring members has a first portion that overlies a protrusion on one side of a portable consumer product such as a portable wireless loudspeaker, and a second portion that is adjacent to the plug body. In this non-limiting example, plug body anchoring member 70 includes first portion 72 which overlies a protrusion on one face of a portable loudspeaker. Recess 73 is sized and shaped to fit around a protrusion on a portable loudspeaker. Alternatively, the portion of anchoring member 70 that mechanically couples to the consumer product could be designed to fit around a different protrusion, or even fit into a depression, on the outside of the consumer product. Second portion 74 of anchoring member 70 is constructed and arranged to locate against or very close to one side of plug body 20 when the assembly 100 is in place as shown FIG. 8. Recess 75 accepts and locates a portion of tie member 98, as described below. Second plug body anchoring member 80 also has a first portion 82 which overlies a protrusion on a different face or surface of the portable loudspeaker. Recess 83 is sized and shaped to fit around the protrusion. Second portion 84 of anchoring member 80 is located against or very close to another side of plug body 20 when assembly 100 is in place. Recess 85 accepts and locates a portion of tie member 98, also as described below.

Tie member 98 couples to and locks together anchoring members 70 and 80 in such a manner that the plug body is secured to the portable loudspeaker. Tie member 98 in this non-limiting example includes two essentially identical tie member portions, with tie member portion 90 shown in FIG. 5. Tie member portion 90 includes waist 92 that interfaces with recess 75 or 85 on one of the plug body anchoring members, and opposed coupling ends 94 and 96. In this non-limiting example, the only difference between the two tie member portions which make up tie member 98 is that in one of them ends 94 and 96 are drilled through and in the other of them these ends are tapped. This arrangement allows the two tie member portions to be coupled together by two machine screws, so as to fully capture the plug body, as further described below. Tie member 98 could take many other forms that are able to couple anchoring members 70 and 80 together so that they cannot be pulled away from the portable consumer product. Also, tie member 98 could potentially mount directly to a surface so as to lock the assembly in a solid state while maintaining the initial status of retention to the product.

Wiring harness 10 is shown coupled to and secured to end 116 of portable loudspeaker 110 in FIG. 6. This is but one example of a consumer product and of the location of its input electrical connectors. For other product configurations, assembly 100 would be designed differently so as to accomplish the same results. Portable loudspeaker 110 in this case has front and rear lips 112 and 114 which act as anchoring locations for plug body anchoring members 70 and 80, respectively, in the manner described above. The plug body is operably coupled to and secured to the portable loudspeaker as follows. Plug body 20 is grasped and pushed into loudspeaker 110 such that plugs/connectors 42 and 44 fit into receiving jacks/connectors in end 116 of loudspeaker 110. This operably couples wiring harness 10 to loudspeaker 110 so as to provide power, audio signals and control signals to the loudspeaker, as desired by the user. In one non-limiting example described below, wiring harness 10 is used to physically secure and functionally operate a portable wireless loudspeaker at retail display.

Figure 7A:
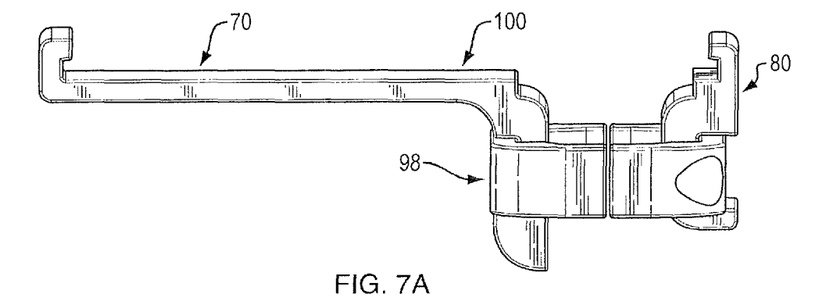
FIGS. 7A, 7B and 7C are top, front and perspective views, respectively, of the plug body anchoring members of FIGS. 3 and 4, and two of the tie members of FIG. 5, engaged with the plug body of FIG. 2.
Figure 7B:
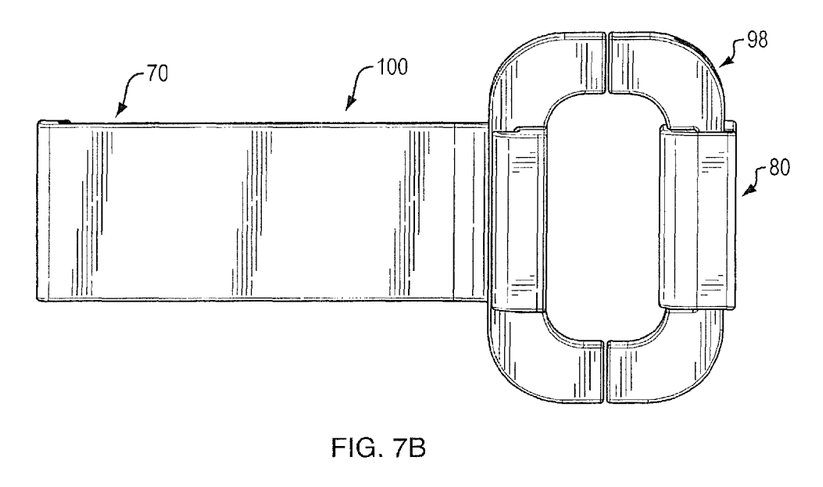
Figure 7C:
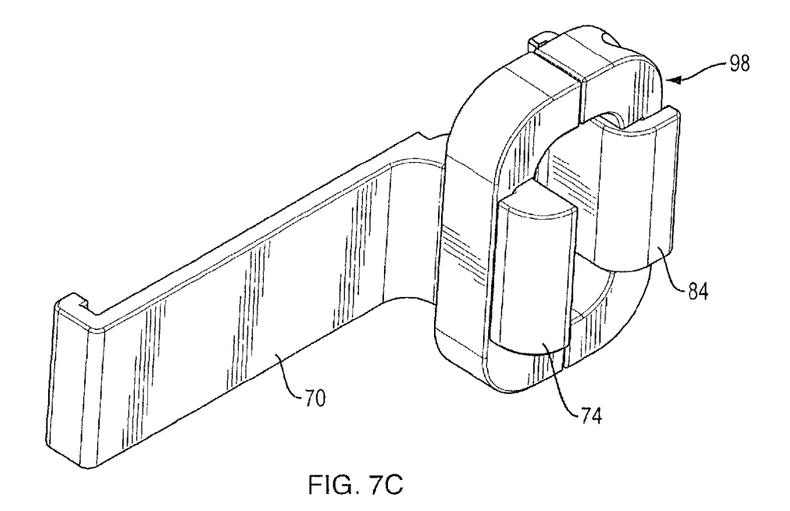
Figure 8:
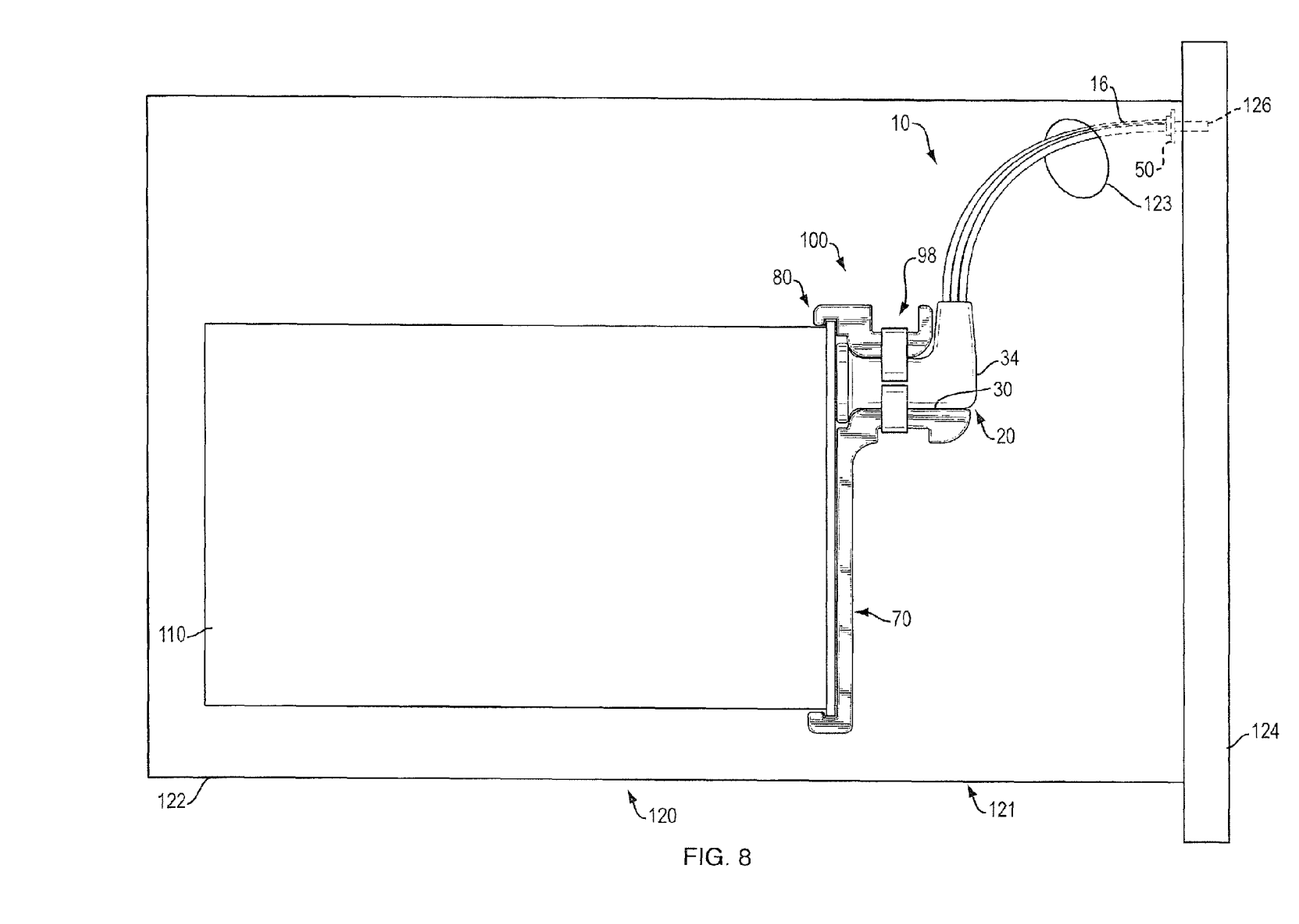
FIG. 8 is top view of a merchandise display with a consumer product and a wiring harness.

Once wiring harness 10 is operably coupled to loudspeaker 110 in this manner, plug body anchoring members 70 and 80 are placed over lips 112 and 114 and engaged with portion 30 of plug body 20 in such a manner that annular ridge 32 sits in recesses 76 and 86 of anchoring members 70 and 80. The two tie member portions 90 are then placed into recesses 75 and 85 and coupled together with machine screws such that they encircle plug body 20, and mechanically couple anchoring members 70 and 80 together. See FIG. 7, which shows assembly 100 comprising the engaged anchoring members and tie members, without the wiring harness or portable consumer product. Results of this construction are that the anchoring members cannot be removed from the loudspeaker without damaging protrusions 112 and 114, and the plug body is securely held in place while at the same time being operably coupled to the loudspeaker so as to provide needed or desired electrical signals to the loudspeaker.

One use of wiring harness 10 is to securely tether a portable consumer product such as wireless loudspeaker 110 to a retail display location while not marring or damaging the loudspeaker, and at the same time allowing the loudspeaker to fully function. One non-limiting example of such is shown FIG. 8 in which merchandise display 120 includes display structure 121 with top or counter 122 and vertical or end wall 124. Portable loudspeaker 110 is placed on top 122. Wiring harness 10 is operably coupled to loudspeaker 110 by engaging plug body 20 with the loudspeaker as described above. Assembly 100 is then coupled to the loudspeaker and the plug body as described above. The distal end of security cable 16 can then be secured to a fixed location in or around the display, which in this non-limiting example is illustrated as wall 124. Screw 126 passing through annular enlarged end 50 of cable 16 can be used, or the security cable can be fastened or secured to the display or a different fixed structure in another manner such as using a bolt or another fastener, or the like. Electrical connectors 13 and 15 are operably coupled to a source or sources of audio signals, control signals and power. Since wiring harness 10 includes a strong security cable 16 that cannot easily be cut or otherwise parted or broken, wiring harness 10 inhibits shoplifting of consumer product 110.

A number of implementations have been described. Nevertheless, it will be understood that additional modifications may be made without departing from the scope of the inventive concepts described herein, and, accordingly, other embodiments are within the scope of the following claims.

What is claimed is:

1. A wiring harness, comprising:
   a plurality of electrical wires, each constructed and arranged to carry electrical signals, and each having a length, wherein the plurality of electrical wires carry power, data, and audio signals;
   a security cable that is not constructed and arranged to carry electrical signals, wherein the security cable has a length that is less than the length of any of the plurality of electrical wires, and has a greater tensile strength than that of any of the plurality of electrical wires;
   wherein the electrical wires and the security cable are bonded together over only a portion of their respective lengths into a reinforced multi-wire cable assembly, and wherein over another portion of their respective lengths the plurality of electrical wires and the security cable are separate from one another;
   an overmolded plug body at one end of the reinforced multi-wire cable assembly;
   an assembly that is constructed and arranged to secure the plug body to a portable loudspeaker such that the plug body is operably coupled to the loudspeaker in a manner such that the power, the data, and the audio signals, are provided to and used to operate the loudspeaker; and
   wherein the portable loudspeaker has opposed sides that each include a protrusion, and wherein the assembly that is constructed and arranged to secure the plug body to a portable loudspeaker comprises two separate plug body anchoring members each of which has a first portion that overlies a protrusion on a side of the loudspeaker and a second portion that is adjacent to the plug body.

2. The wiring harness of claim 1 wherein the power and the data are carried over one wire.

3. The wiring harness of, claim 2 wherein the data comprise control signals.

4. The wiring harness of claim 1 further comprising a strain relief structure that is part of the reinforced multi-wire cable assembly.

5. The wiring harness of claim 4 wherein the strain relief structure comprises a ring that is integral with the reinforced multi-wire cable assembly.

6. The wiring harness of claim 1 wherein the security cable has an enlarged end that is embedded in the plug body.

7. The wiring harness of claim 1 wherein the assembly that is constructed and arranged to secure the plug body to a portable loudspeaker further comprises a tie member that is coupled to and overlies the second portions of the plug body anchoring members, and that encircles the plug body.

8. The wiring harness of claim 7 wherein the tie member comprises two separable tie member portions that are coupled together to create the tie member.

9. The wiring harness of claim 1 wherein the second portions of the anchoring members each have a plug body retention feature that engages with the plug body to inhibit the plug body from being operably decoupled from the loudspeaker.

10. The wiring harness of claim 9 wherein the plug body has one or more protrusions that are located proximate the loudspeaker when the plug body is operably coupled to the loudspeaker, and wherein the plug body retention features comprise a recess in each anchoring member into which a protrusion is fitted.

11. The wiring harness of claim 1 wherein the plug body comprises a first portion that is adjacent to the loudspeaker, wherein the plurality of electrical wires are terminated by plugs that protrude from the first portion of the plug body and are received in the loudspeaker.

12. The wiring harness of claim 11 wherein the plug body further comprises a second portion that is integral with and lies at an angle to the first portion, and that is overmolded on the reinforced multi-wire cable assembly.

13. A merchandise display for a portable electronic consumer product that has opposed sides that each include one or more protrusions, where the portable electronic consumer product also has a plurality of electrical connectors that are adapted to accept power, data and audio signals which are used to operate the consumer product, the display comprising:
   i) a display structure that is constructed and arranged to support the consumer product; and
   ii) a wiring harness for physically securing, and providing the power, the data and the audio signals to, the consumer product, the wiring harness comprising:

a plurality of electrical wires that together carry the power, the data and the audio signals, each having a length;

a security cable that is not constructed and arranged to carry electrical signals, wherein the security cable has a length that is less than the length of any of the plurality of electrical wires, and has a greater tensile strength than that of any of the plurality of electrical wires;

wherein the plurality of electrical wires and the security cable are bonded together over only a portion of their respective lengths into a reinforced multi-wire cable assembly, and wherein over another portion of their respective lengths the plurality of electrical wires and the security cable are separate from one another;

an overmolded plug body at one end of the reinforced multi-wire cable assembly; and an assembly that is constructed and arranged to secure the plug body to the consumer product such that the plug body is operably coupled to the consumer product in a manner such that the power, the data and the audio signals are provided to and used to operate the consumer product, wherein the assembly that is constructed and arranged to secure the plug body to a consumer product comprises two separate plug body anchoring members each of which has a first portion that overlies a protrusion on a side of the consumer product and a second portion that is adjacent to the plug body, and a tie member that is coupled to and overlies the second portions of the plug body anchoring members, and that encircles the plug body, wherein the second portions of the anchoring members each have a plug body retention feature that engages with the plug body to inhibit the plug body from being operably decoupled from the consumer product;

wherein the wiring harness is physically coupled to the display structure, to inhibit the consumer product from being removed from the display structure.

14. The merchandise display of claim 13 wherein:

the plug body has one or more protrusions that are located proximate the consumer product when the plug body is operably coupled to the consumer product, and wherein the plug body retention features comprise a recess in each anchoring member into which a protrusion is fitted;

the plug body comprises a first portion that is adjacent to the consumer product, wherein the plurality of electrical wires are terminated by connectors that protrude from the first portion of the plug body and are received in the consumer product; and the plug body further comprises is second portion that is integral with and lies at an angle to the first portion, and that is overmolded on the reinforced multi-wire cable assembly.

15. The merchandise display of claim 14 wherein:

the security cable has an enlarged end that is embedded in the plug body;

the power and the data are carried over one wire of the wiring harness;

the data comprise control signals; and the wiring harness is operably connected to the consumer product such that the power, the control signals and the audio signals are provided to and used to operate the consumer product.

\* \* \* \* \*